(12) United States Patent
Cudak et al.

(10) Patent No.: US 9,456,082 B2
(45) Date of Patent: Sep. 27, 2016

(54) DETERMINING PROBABLE TOPICS OF CONVERSATION BETWEEN USERS OF TWO COMMUNICATION DEVICES

(71) Applicant: Lenovo Enterprise Solutions (Singapore) Pte. Ltd., Singapore (SG)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 118 days.

(21) Appl. No.: 14/104,116

(22) Filed: Dec. 12, 2013

(65) Prior Publication Data

US 2015/0172461 A1 Jun. 18, 2015

(51) Int. Cl.
| | |
|---|---|
| *H04M 11/10* | (2006.01) |
| *H04M 3/436* | (2006.01) |
| *H04W 4/16* | (2009.01) |
| *H04W 4/12* | (2009.01) |
| *H04M 3/42* | (2006.01) |

(52) U.S. Cl.
CPC ....... *H04M 3/4365* (2013.01); *H04M 3/42059* (2013.01); *H04W 4/12* (2013.01); *H04W 4/16* (2013.01)

(58) Field of Classification Search
CPC .................... H04M 3/42221; H04M 2201/40; H04M 3/5307; G10L 15/26; G10L 2015/088; G06F 17/289

USPC ........ 455/412.2, 418, 420, 41.2, 412.1, 566, 455/407, 557, 550.1, 457, 456.1, 450, 67.7, 455/433, 406, 413
See application file for complete search history.

(56) References Cited

U.S. PATENT DOCUMENTS

| | | | |
|---|---|---|---|
| 6,322,366 B1 * | 11/2001 | Bergan et al. ................. | 434/118 |
| 6,411,683 B1 | 6/2002 | Goldberg et al. | |
| 6,842,460 B1 * | 1/2005 | Olkkonen et al. ............ | 370/465 |
| 8,296,152 B2 | 10/2012 | Issa et al. | |
| 2005/0090292 A1* | 4/2005 | Yasutake ........................ | 455/567 |
| 2005/0159141 A1* | 7/2005 | Osborn, Jr. ................ | 455/414.2 |

(Continued)

FOREIGN PATENT DOCUMENTS

| | | |
|---|---|---|
| WO | WO2009134462 A2 | 11/2009 |
| WO | WO2011079462 A1 | 7/2011 |

OTHER PUBLICATIONS

Hazen et al, "Topic Identification From Audio Recordings Using Word and Phone Recognition Lattices" IEEE Workshop on Automatic Speech Recognition & Understanding, vol. 90(7), pp. 659-664, 2007.

*Primary Examiner* — Joseph Arevalo
(74) *Attorney, Agent, or Firm* — Katherine S. Brown; Jeffrey L. Streets

(57) ABSTRACT

A computer program product includes computer readable program code for identifying a proposed call between a caller using a first communication device and a recipient using a second communication device, computer readable program code for determining probable topics of conversation of the proposed call, and computer readable program code for displaying the probable topics of conversation on either the first communication device, the second communication device or both the first and second communication devices before the proposed call is connected.

7 Claims, 6 Drawing Sheets

(56) References Cited

U.S. PATENT DOCUMENTS

| | | |
|---|---|---|
| 2008/0037754 A1 | 2/2008 | Bishop |
| 2008/0079539 A1* | 4/2008 | Daley et al. ............ 340/7.29 |
| 2008/0104612 A1 | 5/2008 | Abernethy, Jr. et al. |
| 2008/0248781 A1* | 10/2008 | Cedo Perpinya et al. . 455/412.1 |
| 2009/0070683 A1* | 3/2009 | Ward et al. .............. 715/738 |
| 2009/0281849 A1* | 11/2009 | Choi et al. .................. 705/7 |
| 2010/0158213 A1* | 6/2010 | Mikan et al. ........... 379/88.14 |
| 2011/0200181 A1 | 8/2011 | Issa et al. |
| 2012/0099594 A1* | 4/2012 | Lau et al. ................ 370/392 |
| 2013/0022189 A1* | 1/2013 | Ganong et al. ........ 379/202.01 |
| 2013/0024196 A1* | 1/2013 | Ganong et al. ........... 704/246 |
| 2013/0144595 A1* | 6/2013 | Lord et al. ................. 704/2 |
| 2013/0183946 A1 | 7/2013 | Jeong |
| 2013/0195258 A1* | 8/2013 | Atef et al. .............. 379/88.01 |
| 2014/0074537 A1* | 3/2014 | Bargetzi et al. ........... 705/7.19 |
| 2014/0081914 A1* | 3/2014 | Smith ............ G06Q 10/107 707/614 |

* cited by examiner

DETERMINING PROBABLE TOPICS OF CONVERSATION BETWEEN USERS OF TWO COMMUNICATION DEVICES

BACKGROUND

1. Field of the Invention

The present invention relates to communication devices and systems, such as telephones and communication networks, and methods of using those communication devices and systems.

2. Background of the Related Art

Mobile communication devices, such as telephones, are an integral part of everyday life in a modern society. Telephones that are connected to a land line are even on the decline, as people become accustomed to having a mobile phone with them at all times. The functions and features available on a mobile phone continue to expand, including apps, a web browser, a camera, full physical or virtual keypads, touchscreens, wifi and Bluetooth connectivity, texting and email, and more.

When a first communication device is used to place a call to a second communication device, a telephone number or other identification associated with the second communication is entered using a keypad or voice command of the first communication device, or is identified from a list of contacts stored within the first communication device. Once the caller has initiated a call with the first communication device, the second communication device will typically produce an audible ring tone or vibrate in order to notify a called party ("recipient") of the call. However, due to the wide range of tasks that a user may perform on their telephone, the variety of social contexts that a user may be involved in due to increasing mobility and usability of telephones, and the resulting increase in the amount of time that a user spends on their telephone, it is increasingly common that a call will not be answered promptly or, if answered, that the purpose of the call cannot be satisfied.

While voicemail is helpful for dealing with missed calls, a voice message is inherently a one-way communication from the calling party to the called party. Accordingly, voicemail frequently does not satisfy the calling party's need to talk with the called party. For example, in an urgent situation, a calling party may need to obtain information or assistance from the called party. Conversely, if the calling party wants to have an extended interactive discussion with the called party, voicemail does not provide the interaction with the called party that may be needed to efficiently achieve the purpose of the call. Since the called party is typically unaware of the purpose of the calling party's call, it is frequently the result that a first phone call between the two parties will only result in a plan to have a second phone call at a later point in time.

BRIEF SUMMARY

One embodiment of the present invention provides a computer program product including computer readable program code embodied on a computer readable storage medium. The computer program product comprises computer readable program code for identifying a proposed call between a caller using a first communication device and a recipient using a second communication device, computer readable program code for determining probable topics of conversation of the proposed call, and computer readable program code for displaying the probable topics of conversation to the first communication device, the second communication device or both the first and second communication devices before the proposed call is connected.

DETAILED DESCRIPTION

Figure 1:
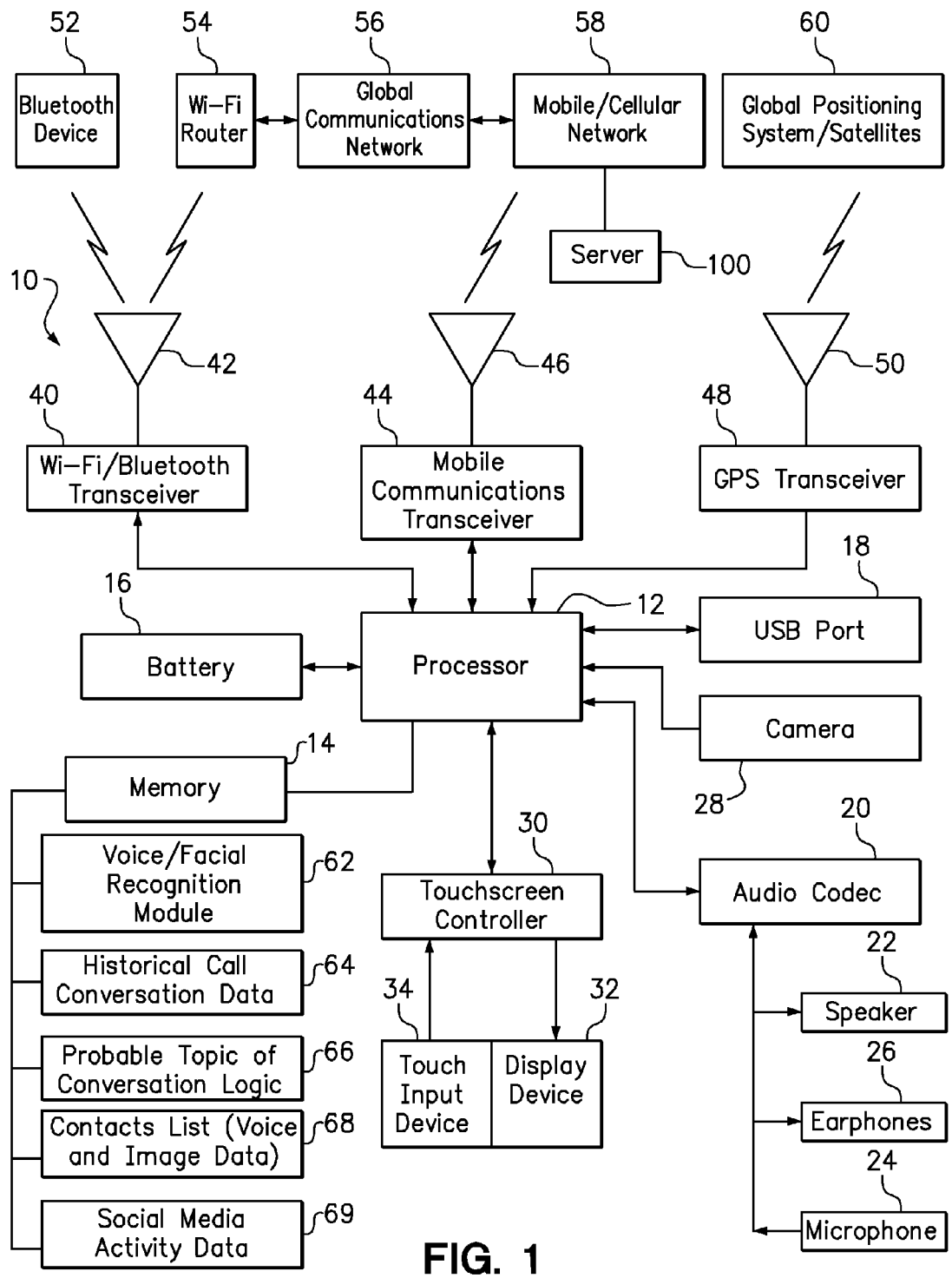
FIG. 1 is a block diagram of the components of a communication device in accordance with one embodiment of the invention.

One embodiment of the present invention provides a method, comprising identifying a proposed call between a caller using a first communication device and a recipient using a second communication device, determining probable topics of conversation of the proposed call, and displaying the probable topics of conversation to the first communication device, the second communication device or both the first and second communication devices before the proposed call is connected.

Identifying a proposed call between a caller using a first communication device and a recipient using a second communication device may take various forms. For example, a caller may provide input to the first communication device actually initiating a call to the recipient, but the input might also be the act of selecting a contact from a contact list prior to initiating a call to the recipient. The input may, for example, be entered into the caller's communication device through a touchscreen, voice command, physical keys, or some other user interface.

Embodiments of the present invention include determining probable topics of conversation of the proposed call. Determining probably topics of conversation for the caller, which topics may be provided to the recipient, is preferably performed by the first communication device or a network server, since either device may be authorized to monitor the caller's activity. For example, a probable topic of conversation of a call between the caller and the recipient may be determined by: (1) analyzing a previous conversation between the caller (first communication device) and the recipient (second communication device) to identify keywords associated with a probable topic of conversation, (2) analyzing the most recent conversations involving the caller (first communication device) to identify keywords associated with a probable topic of conversation, (3) analyzing most recent conversations between the caller and at least one other person to identify keywords associated with a probable topic of conversation, wherein the caller, the recipient and the at least one other person are all members of the same social group, (4) analyzing recent messages exchanged between the caller (first communication device) and the recipient (second communication device) to identify keywords associated with a probable topic of conversation, wherein the messages are selected from email messages, text message, voicemail messages, and combinations thereof, (5) analyzing online content recently viewed by the caller using the first communication device to identify keywords associated with a probable topic of conversation; (6) analyzing recent posts to a social media account of the caller to identify keywords associated with a probable topic of conversation; and (7) analyzing a social media account of the caller to identify a recent change in relationship status of the caller. A social group may be identified, for example, by common membership in an organization or online interaction through social media, such as Twitter, Facebook, participation on message boards, gaming or other subscriptions. Similarly, determining probably topics of conversation for the recipient, which topics may be provided to the caller, is preferably performed by the second communication device or a network server, since either device may be authorized to monitor the recipient's activity.

In a further embodiment, the method may further include displaying an indication of probability associated with each of the probable topics of conversation. Optionally, the method may increase the probability of a probable topic of conversation in response to detecting that the probable topic of conversation has experienced an increase in prevalence on a predetermined news website or is trending higher on online social media. In another option, the method may increase the probability of a probable topic of conversation as a function of an amount of time the caller has viewed online content regarding the probably topic or as a function of the number of websites recently viewed that contain content regarding the same probable topic of conversation. Still further, the probability associated with each of the probable topics of conversation may be based upon a factor selected from a number of calls involving the caller within a recent time frame on the probable topic, a number of social media posts or blog entries made by the caller on the probable topic, an amount of time the caller has spent viewing online content regarding the probable topic, a number of recent updates from a news website on the probable topic, and combinations thereof. A preferred display of the probable topics may be listed or ranked in order of increasing or decreasing probability associated with each of the probable topics of conversation.

A still further embodiment of the method further includes determining the identity of a person, other than the recipient, in proximity to either or both of the communication devices. The method may then determine which of the probable topics of conversation are to be avoided based on the identity of the person in proximity to the communication device, and display the probable topics of conversation to the other party on their communication device along with an indication of which of the probable topics of conversation are to be avoided.

The identity of a person, other than the user, in proximity to the communication device may be determined in various ways including, without limitation, (1) using a camera on the communication device to capture an image and analyzing the image using a facial recognition software module to identify the person from among a stored contact list (2) using a microphone on the communication device to capture sounds and analyzing the sounds using a voice recognition software module to identify the person from among a stored contact list, (3) using a wireless receiver on the communication device to detect another communication device in proximity of the communication device and determine the identity of a person whose communication device is detected by the wireless receiver, or (4) combinations thereof. The determination of which of the probable topics of conversation are to be avoided may be made by the communication device or a network server with access to the foregoing information collected by the communication device.

The probable topics of conversation that are to be avoided based on the identity of the person in proximity to the communication device may be determined in various way. Non-limiting examples of this determination include: (1) determining whether the person has a negative sentiment about each of the probable topics of conversation and identifying the probable topics of conversation for which the person has been determined to have a negative sentiment, (2) determining whether the identified people are younger than a predetermined age restriction for the probable topics, (3) determining whether the recipient is using a speakerphone, and (4) combinations thereof. In one option, negative sentiment is identified by analyzing previous conversations with the person or social media content posted by the person.

One embodiment of the present invention provides a computer program product including computer readable program code embodied on a computer readable storage medium. The computer program product comprises computer readable program code for identifying a proposed call between a caller using a first communication device and a recipient using a second communication device, computer readable program code for determining probable topics of conversation of the proposed call, and computer readable program code for displaying the probable topics of conversation to the first communication device, the second communication device or both the first and second communication devices before the proposed call is connected.

The foregoing computer program product may further include computer readable program code for implementing or initiating any one or more aspects of the methods described herein. Accordingly, a separate description of the methods will not be duplicated in the context of a computer program product.

It should be recognized that any of the embodiments of the method or computer program product may cover both a first situation where the first communication device initiates a call to the second communication device and a second situation where the second communication device initiates a call to the first communication device. In other words, the probable topics of conversation of a recipient communication device may be provided to the calling communication device prior to connecting a call there between, the probable topics of conversation of the calling communication device may be provided to the recipient communication device prior to connecting a call there between, or both the recipient and calling communication devices may provide their probable topics of conversation to the other of the communication devices prior to connecting a call there between. Accordingly, either of the caller or recipient, or both the caller and the recipient, (via their respective communication devices) may have the benefit of the other's probable topics of conversation before the call is connected. It should be further recognized that either of the caller or recipient, or both the caller and the recipient, (via their respective communication devices) may use the components and sensors of the communication devices to collect data regarding ambient conditions for use in determining a probable topics of conversation in accordance with various embodiments of the present invention.

FIG. 1 is a block diagram of the components in one example of a communication device 10, such as a smart phone, capable of implementing embodiments of the present invention. The block diagram may be representative of both a first communication device and a second communication device in accordance with various embodiments of the present invention. The communication device 10 may include a processor 12, memory 14, a battery 16, a universal serial bus (USB) port 18, a camera 28, and an audio codec 20 coupled to a speaker 22, a microphone 24, and an earphone jack 26. The communication device 10 may further include a touchscreen controller 30 which provides a graphical output to the display device 32 and an input from a touch input device 34. Collectively, the display device 32 and touch input device 34 may be referred to as a touchscreen.

The communication device 10 may also include a Wi-Fi and/or Bluetooth transceiver 40 and corresponding antenna 42 allowing the device to communicate with a Bluetooth device 52 or a Wi-Fi router 54, a mobile communication transceiver 44 and corresponding antenna 46 allowing the device to communicate over a mobile/cellular network 58, and a global positioning system (GPS) transceiver 48 and corresponding antenna 50 allowing the device to obtain signals from a global positioning system or satellites 60. In a non-limiting example, the Wi-Fi router 54 and the mobile/cellular network 58 may be connected to a global communications network 56, such as the Internet. Furthermore, mobile/cellular network 58 may include or access a server for the purpose of storing call conversation data or voice/facial recognition module(s) for the communication device 10. When the communication device 10 has memory 14 with sufficient capacity, it may be preferable to include any or all of these data storage and logic functions within the communication device itself. As shown, the memory 14 stores a voice and/or facial recognition module 62, historical call conversation data 64, probable topic of conversation logic 66, and a Contacts list 68 with optional voice data and image data associated with one or more of the contacts in the list to facilitate voice recognition and facial recognition.

Figure 2:
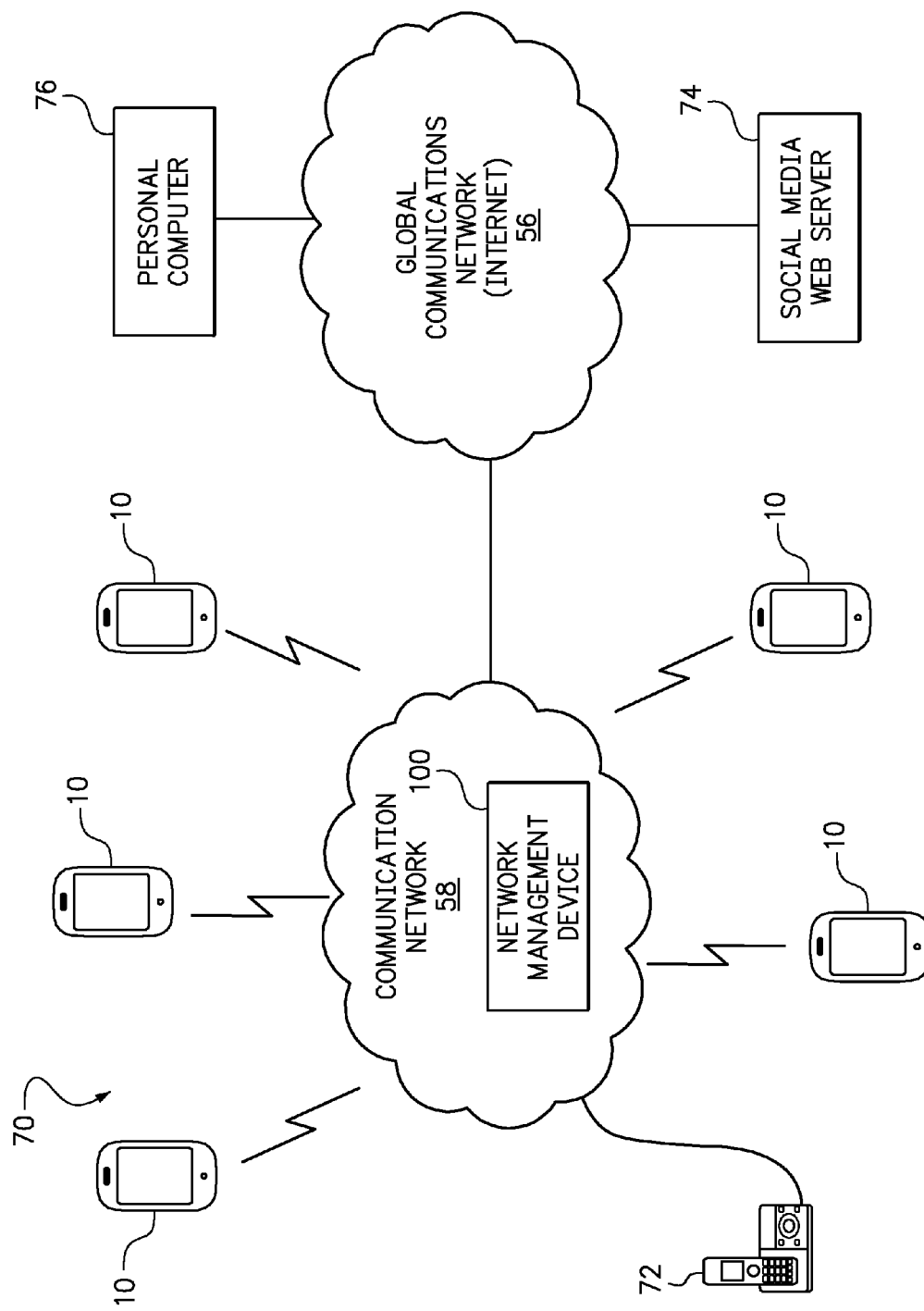
FIG. 2 is a diagram of a system including a communication network enabling communication between a plurality of communication devices, including a mobile communication device.

FIG. 2 is a diagram of a system 70 including a communication network 58 enabling communication between a plurality of communication devices, such as a telephone 72 coupled to a land line and multiple mobile telephones 10. The communication network 58 may be managed by a network management device 100. The network management device 100 may be responsible for establishing connections between communications devices, and may also provide one or more services to the communications devices. For example, although the methods of the invention may be implemented within the communication devices 10, 72 it is also possible to implement one or more steps of the methods or one or more functions of the computer program code of the present invention in the network management device 100. In one non-limiting example, the network management device 100 may run a voice/facial recognition module 62, store historical call conversation data 64.

The communication network 58 may also allow communication with a global communications network 56, such as the Internet. Accordingly, a social media web server 74 may be accessed by the communication devices 10, or may be accessed by a personal computer 76. A given user may own and control a communication device 10 and a personal computer 76, and may access the social media web server 74 from either device. Accordingly, the user's social media account may be accessed using either device 10, 76. A history of social media interaction, or even email, blogging or other online activity, may be maintained on the individual devices 10, 76, on the social media web server 74 or one or more similar servers.

Figure 3:
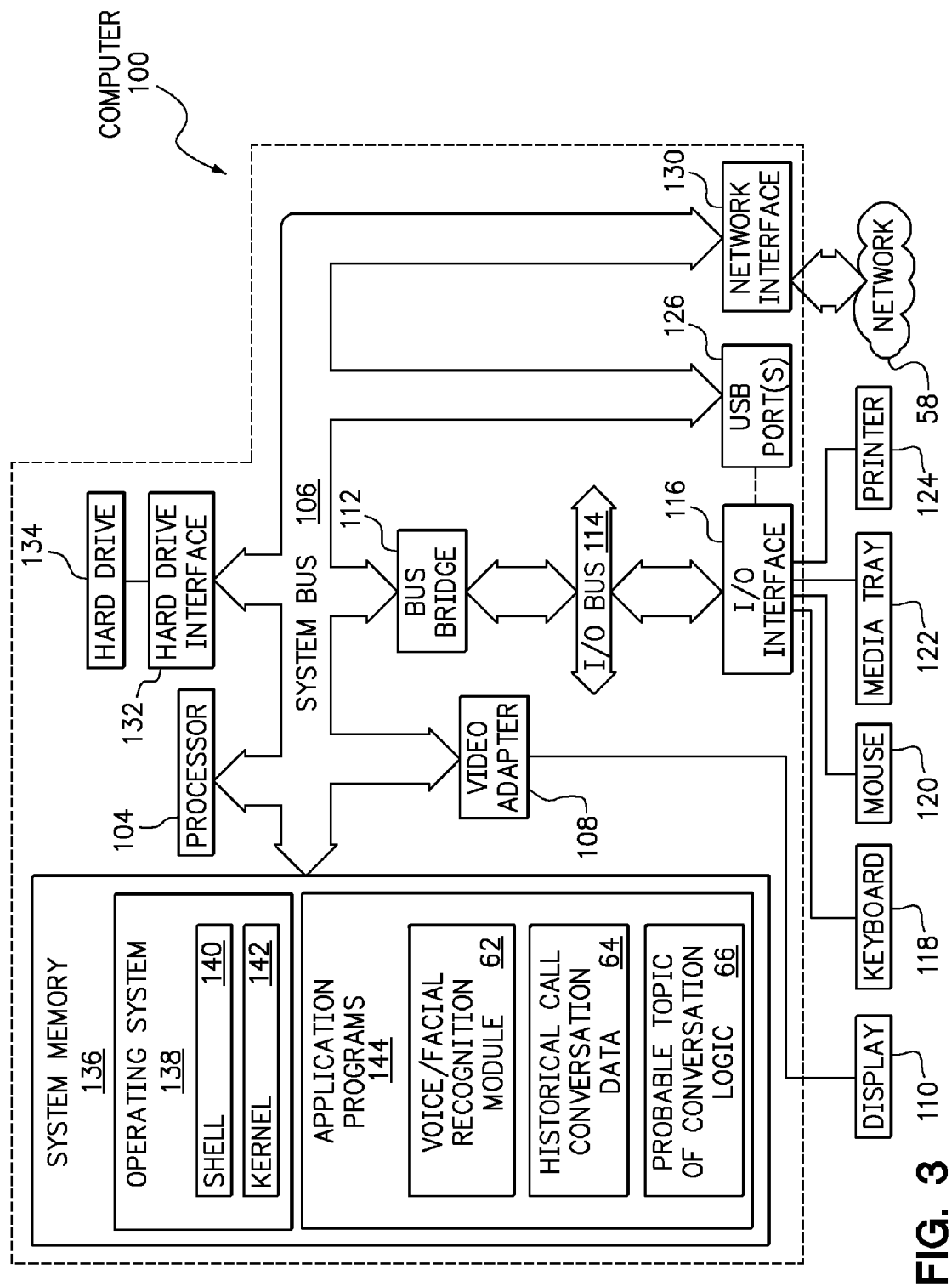
FIG. 3 is a diagram of an exemplary compute node (or simply "computer") that may be utilized as the network management device consistent with some embodiments of the present invention.

FIG. 3 is a diagram of an exemplary compute node or server (or simply "computer") 100 that may be utilized as the network management device consistent with embodiments of the present invention. Note that some or all of the exemplary architecture, including both depicted hardware and software, shown for and within computer 100 may be implemented in the server or network management device 100 as shown in FIGS. 1-2. The computer 100 is also illustrative of a social media web server 74 or other server that may implement one or more feature of the present invention.

The computer 100 includes a processor unit 104 that is coupled to a system bus 106. Processor unit 104 may utilize one or more processors, each of which has one or more processor cores. A video adapter 108, which drives/supports a display 110, is also coupled to the system bus 106. The system bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and USB port(s) 126. While the format of the ports connected to I/O interface 116 may be any known to those skilled in the art of computer architecture, in a preferred embodiment some or all of these ports are universal serial bus (USB) ports. As depicted, the computer 100 is able to communicate over a network 58 using a network interface 130. The network 58 may be an external network such as the cellular network or global communication network 56, and perhaps also an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 100. This volatile memory includes additional higher levels of volatile memory (not shown), including, but not limited to, cache memory, registers and buffers. Data that populates system memory 136 includes computer 100's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes a kernel 142, which includes lower levels of functionality for the OS 138, including providing essential services required by other parts of OS 138 and application programs 144, including memory management, process and task management, disk management, and mouse and keyboard management. Application programs 144 in the system memory of computer 100 may include various programs and modules for implementing the methods described herein, such as the voice and/or facial recognition module 62, historical call conversation data 64, and/or probable topic of conversation logic 66.

The hardware elements depicted in computer 100 are not intended to be exhaustive, but rather are representative components suitable to perform the processes of the present invention. For instance, computer 100 may include alternate memory storage devices such as magnetic cassettes, digital versatile disks (DVDs), Bernoulli cartridges, and the like. These and other variations are intended to be within the spirit and scope of the present invention.

Figure 4:
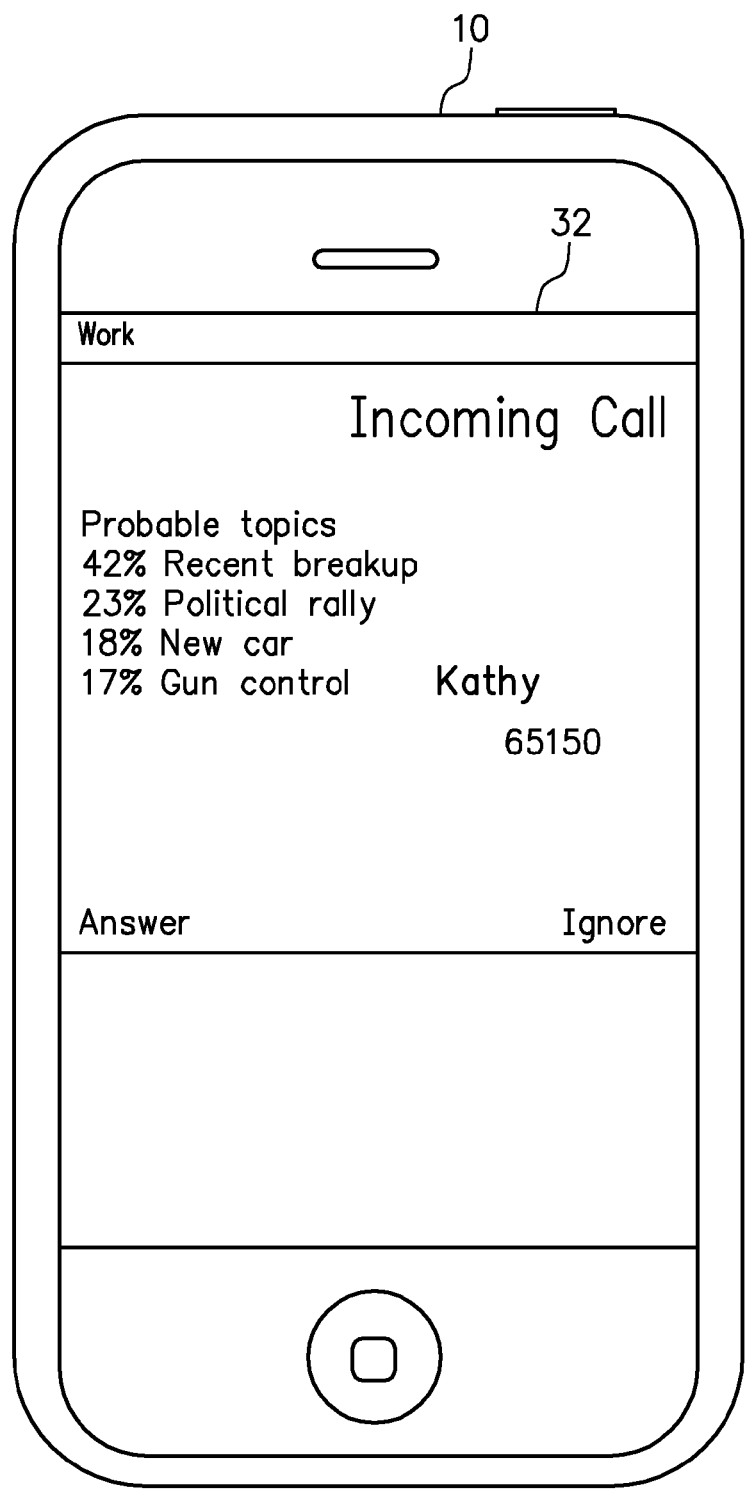
FIG. 4 is a diagram of a recipient's communication device having a display screen displaying probable topics of conversation associated with an incoming call.

FIG. 4 is a diagram of a recipient's communication device 10 ("second communication device") having a display screen 32 displaying "Probable Topics" of conversation associated with an incoming call. After a caller has identified a recipient of a proposed call, the recipient's communication device 10 displays the Probable Topics of conversation of the display screen 32. As shown, the display shows that there is an incoming call, identifies the caller by name (i.e., from a Contacts list or caller ID), includes buttons for answering or ignoring the call, and provides a "Probable Topics" list for the proposed call. The probable topics are provided along with a probability associated with each probable topic, and are ranked in order of decreasing probability (i.e., from highest probability to lowest probability).

Figure 5:
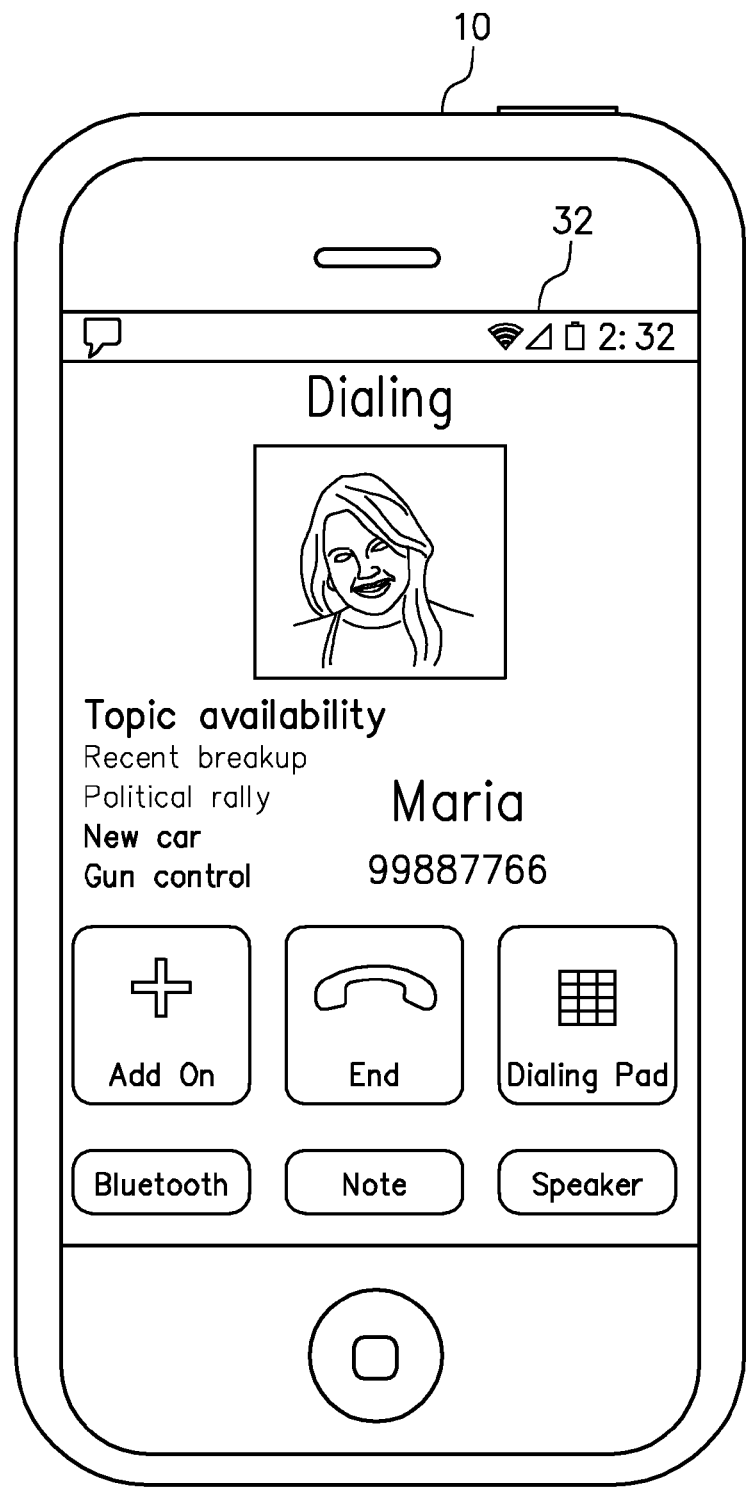
FIG. 5 is a diagram of a caller's communication device having a display screen displaying probable topics of conversation associated with an outgoing call.

FIG. 5 is a diagram of a caller's communication device 10 ("first communication device") having a display screen 32 displaying a "Topic Availability" list which shows each of probable topics of conversation associated with an outgoing call. While the caller may not benefit from a mere list of probable topics that they (the caller) might want to discuss, the list of "Topic Availability" includes an indication of which probable topics of conversation the recipient may be available to discuss and those that should be avoided. As shown, the Topic Availability list includes each of the Probable Topics, but indicates that the topics of "Recent Breakup" and "Political Rally" should be avoided at this time, whereas the recipient may be available to discuss the topics of "New Car" and "Gun Control". The display may further indicate which of the probable topics of conversation are favored for discussion, which of the probable topics of conversation should be avoided, which of the probable topics are tentatively acceptable for discussion, and combinations thereof.

Figure 6:
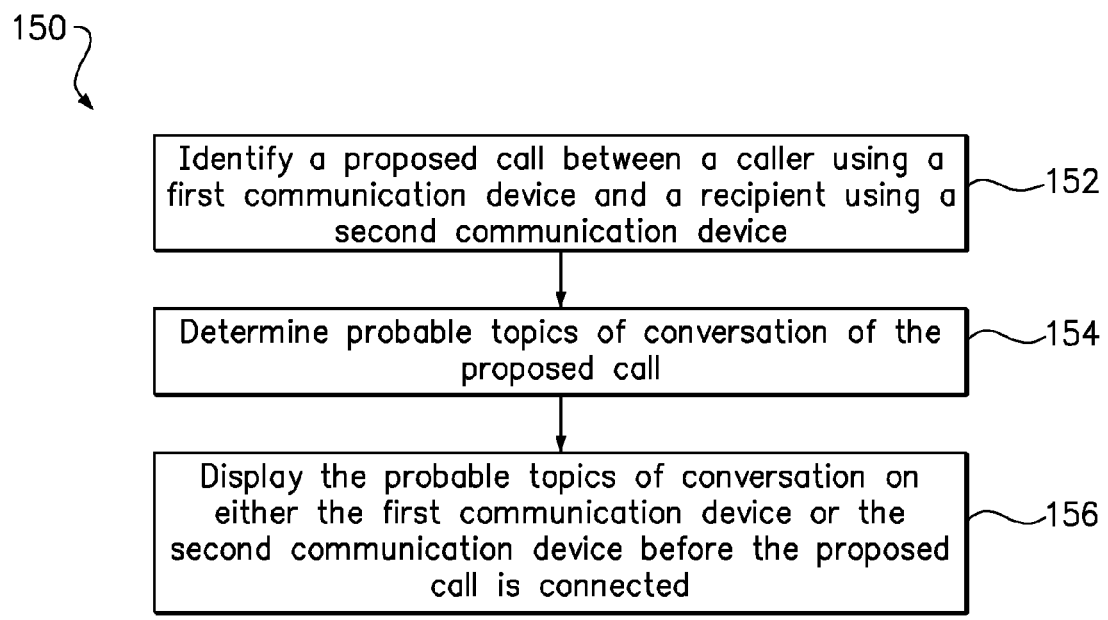
FIG. 6 is a flowchart of a method in accordance with one embodiment of the present invention.

FIG. 6 is a flowchart of a method 150 in accordance with one embodiment of the present invention. In step 152, the method include identifying a proposed call between a caller using a first communication device and a recipient using a second communication device. In step 154, the method determines probable topics of conversation of the proposed call. In step 156, the probable topics of conversation are displayed on either the first communication device, the second communication device or both the first and second communication devices before the proposed call is connected.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to explain the principles of the invention and the practical application, and to enable others of ordinary skill in the art to understand the invention for various embodiments with various modifications as are suited to the particular use contemplated.

What is claimed is:

1. A computer program product including computer readable program code embodied on a non-transitory computer readable storage medium, the computer program product comprising:
    computer readable program code for identifying a proposed call between a caller using a first communication device and a recipient using a second communication device;
    computer readable program code for determining probable topics of conversation of the proposed call;
    computer readable program code for displaying the probable topics of conversation on either the first communication device, the second communication device, or both the first and second communication devices before the proposed call is connected;
    computer readable program code for determining the identity of a person, other than the recipient, in proximity to the second communication device;
    computer readable program code for determining which of the probable topics of conversation are to be avoided based on the identity of the person in proximity to the second communication device; and
    computer readable program code for displaying the probable topics of conversation to the caller on the first communication device along with an indication of which of the probable topics of conversation are to be avoided.

2. The computer program product of claim 1, wherein the second communication device or a network server determine which of the probable topics of conversation are to be avoided.

3. The computer program product of claim 2, wherein the computer readable program code for determining which of the probable topics of conversation are to be avoided based on the identity of the person in proximity to the second communication device includes computer readable program code for determining whether the person has a negative sentiment about each of the probable topics of conversation and identifying the probable topics of conversation for which the person has been determined to have a negative sentiment.

4. The computer program product of claim 3, wherein the computer readable program code for determining whether the person has a negative sentiment about each of the probable topics of conversation includes computer readable program code for analyzing previous conversations with the person or posts to a social media account of the person.

5. The computer program product of claim 1, wherein the computer readable program code for determining the identity of a person, other than the recipient, in proximity to the second communication device includes:
    computer readable program code for using a camera on the second communication device to capture an image and analyzing the image using a facial recognition software module to identify the person from among a stored contact list;
    computer readable program code for using a microphone on the second communication device to capture sounds and analyzing the sounds using a voice recognition software module to identify the person from among a stored contact list; or computer readable program code for using a wireless receiver on the second communication device to detect another communication device in proximity of the second communication device and determine the identity of a person whose communication device is detected by the wireless receiver.

6. The computer program product of claim 1, wherein the computer readable program code for determining which of the probable topics of conversation are to be avoided based on the identity of the person in proximity to the second communication device includes computer readable program code for determining whether the identified people are younger than a predetermined age restriction for the probable topics.

7. The computer program product of claim 1, wherein the computer readable program code for determining which of the probable topics of conversation are to be avoided based on the identity of the person in proximity to the second communication device includes computer readable program code for determining whether the recipient is using a speakerphone.

* * * * *